(12) United States Patent
Detwiler et al.

(10) Patent No.: US 6,536,668 B1
(45) Date of Patent: *Mar. 25, 2003

(54) DUAL APERTURE OPTICAL SCANNER

(75) Inventors: Paul O. Detwiler, Lawrenceville, GA (US); Barry M. Mergenthaler, Lawrenceville, GA (US)

(73) Assignee: NCR Corporation, Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/507,321

(22) Filed: Feb. 18, 2000

(51) Int. Cl.[7] .................................................. G06K 7/10
(52) U.S. Cl. .................................. 235/462.37; 235/383
(58) Field of Search ........................ 235/462.32, 462.33, 235/462.34, 462.35, 462.36, 462.37, 462.38, 462.39, 462.4, 383, 454; 359/201, 212, 216, 217, 218, 738, 739

(56) References Cited

U.S. PATENT DOCUMENTS

| 3,774,014 A | 11/1973 | Berler |
| 3,818,444 A | 6/1974 | Connell ................. 340/146.3 F |
| 4,018,504 A | 4/1977 | Wu et al. ........................ 350/7 |
| 4,064,390 A | 12/1977 | Hildebrand et al. ......... 235/470 |
| 4,065,343 A | 12/1977 | Stumpe ....................... 156/212 |

(List continued on next page.)

FOREIGN PATENT DOCUMENTS

| EP | 0360249 | 3/1990 |
| EP | 0360250 | 3/1990 |
| EP | 0412351 | 2/1991 |
| EP | 0420643 | 4/1991 |
| EP | 0444958 | 9/1991 |
| GB | 1316985 | 5/1973 |
| JP | 002445 | 1/1977 |
| JP | 228584 | 10/1986 |
| JP | 192175 | 8/1988 |
| JP | 283681 | 3/1990 |
| JP | 283686 | 3/1990 |
| JP | 3218587 | 9/1991 |
| JP | 3252889 | 11/1991 |
| JP | 3252891 | 11/1991 |
| JP | 3253811 | 11/1991 |
| JP | 3257691 | 11/1991 |
| JP | 3257692 | 11/1991 |
| JP | 3265079 | 11/1991 |
| JP | 3266195 | 11/1991 |
| JP | 3271880 | 12/1991 |
| JP | 3271987 | 12/1991 |
| JP | 3271988 | 12/1991 |
| JP | 4347783 | 12/1992 |
| JP | 285873 | 10/2000 |
| WO | 8905013 | 6/1989 |

OTHER PUBLICATIONS

*Laser Beam Scanning*, Marel Dekker, Inc., New York, 1985, pp. 227–229.

Inderrieden, M.T., "Human Factors Study on the Benefits of Two Scanners per Checklane," Sep. 11, 1987.

(List continued on next page.)

*Primary Examiner*—Karl D. Frech
(74) *Attorney, Agent, or Firm*—Paul W. Martin

(57) ABSTRACT

A dual aperture optical scanner which employs a single laser beam to produce horizontal and vertical scan patterns. The optical scanner includes a housing having first and second apertures, a laser beam source, a mirrored spinner having a plurality of facets with different elevation angles for reflecting the laser beam in a plurality of directions, and a plurality of pattern mirrors within the housing for reflecting the laser beam from the spinner through the first and second apertures to an article having a bar code label to be scanned. The optical scanner also includes an optical transceiver for passing the laser beam and for collecting reflected light from the scanned article and a photodetector for generating signals representing the intensity of the light reflected from the article.

20 Claims, 6 Drawing Sheets

U.S. PATENT DOCUMENTS

| | | | |
|---|---|---|---|
| 4,193,540 A | 3/1980 | Dougados et al. | 235/454 |
| 4,333,006 A | 6/1982 | Gorin et al. | 235/457 |
| 4,369,361 A | 1/1983 | Swartz et al. | 235/470 |
| 4,473,746 A | 9/1984 | Edmonds | 250/216 |
| 4,560,862 A | 12/1985 | Eastman et al. | 235/467 |
| 4,652,732 A | 3/1987 | Nickl | 235/462 |
| 4,671,661 A | 6/1987 | Ott | 356/402 |
| 4,713,532 A | 12/1987 | Knowles | 235/467 |
| 4,762,984 A | 8/1988 | Knowles et al. | 235/383 |
| 4,794,237 A | 12/1988 | Ferrante | 235/457 |
| 4,799,164 A | 1/1989 | Hellekson et al. | 235/467 |
| 4,851,667 A | 7/1989 | Mergenthaler et al. | 250/236 |
| 4,861,973 A | 8/1989 | Hellekson et al. | 235/467 |
| 4,872,062 A | 10/1989 | Nanba | 358/443 |
| 4,939,355 A | 7/1990 | Rando et al. | 235/467 |
| 4,960,985 A | 10/1990 | Knowles | 235/467 |
| 4,999,482 A | 3/1991 | Yang | 235/457 |
| 5,000,529 A | 3/1991 | Katoh et al. | 350/6.7 |
| 5,019,694 A | 5/1991 | Collins, Jr. | 235/383 |
| 5,025,477 A | 6/1991 | Baitz et al. | 382/8 |
| 5,042,619 A | 8/1991 | Kohno | 186/61 |
| 5,107,100 A | 4/1992 | Shepard et al. | 235/472 |
| 5,128,520 A | 7/1992 | Rando et al. | 235/375 |
| 5,148,009 A | 9/1992 | Lindacher | 235/462 |
| 5,206,491 A | 4/1993 | Katoh et al. | 235/467 |
| 5,239,169 A | 8/1993 | Thomas | 235/462 |
| 5,256,864 A | 10/1993 | Rando et al. | 235/462 |
| 5,266,788 A | 11/1993 | Yamazaki et al. | 235/467 |
| 5,268,565 A | 12/1993 | Katoh et al. | 235/467 |
| 5,272,322 A | 12/1993 | Nishida et al. | 235/462 |
| 5,293,033 A | 3/1994 | Yamashita | 235/462 |

OTHER PUBLICATIONS

Itrin, S., "Bar Code Scanners: Development and Trends," Logistics Today, vol. 9, Issue 3, May–Jun. 1990, United Kingdom, pp. 29–30—Abstract only.

Hildebrand, A.P., "Generating Multi–Dimensional Scan Using a Single Rotating Component," *Laser Scanning Components & Techniques*, Proceedings of the Society of Photo–Optical Instrumentation Engineers, vol. 84, Aug. 24–25, 1976, San Diego, CA, pp. 85–89.

Wu, P. S., "Omnidirectional Laser Scanner for Supermarkets," SPIE, vol. 378, Laser Scanning and Recording, 1985, pp. 458–463.

DUAL APERTURE OPTICAL SCANNER

BACKGROUND OF THE INVENTION

The present invention relates to optical scanners and more specifically to a dual aperture optical scanner.

Optical scanners are well known for their usefulness in retail checkout and inventory control. Optical scanners generally employ a laser diode, the light from which is focused and collimated to produce a scanning beam. An optical transceiver directs the beam against a mirrored polygon or spinner and then against a plurality of stationary mirrors, and collects the beam after it is reflected by a bar code label. A motor rotates the mirrored polygon, and a detector receives the returning beam. The pattern produced by such a scanner is characterized by lines oriented at various angles to one another.

Typically, optical scanners emit light through one aperture, either horizontal or vertical, but not both. In high performance scanners, light is emitted from several directions through this aperture. In the case of horizontal apertures, a pattern of light is projected onto the front and bottom surfaces of a labelled item. In the case of vertical apertures, a pattern of light is projected onto the front and side surfaces of a labelled item. In low performance scanners, light illuminates only the surface which is facing the aperture.

Unfortunately, scanners having one aperture require item orientation to ensure that the bar code label is properly aligned in relation to the aperture. Orientation time slows item throughput and therefore customer throughput. Item orientation may also cause repetitive strain injury.

Therefore, it would be desirable to produce a high performance optical scanner having two scanning windows which illuminate the bottom and sides of a labeled item, thereby minimizing item orientation and increasing throughput.

SUMMARY OF THE INVENTION

In accordance with the teachings of the present invention, a dual aperture optical scanner is provided. The optical scanner includes a housing having first and second apertures, a laser beam source, a mirrored spinner for reflecting the laser beam in a plurality of directions, and a plurality of pattern mirrors within the housing for reflecting the laser beam from the spinner through the first and second apertures to an article having a bar code label to be scanned.

Preferably, the first aperture is substantially horizontal and the second aperture is substantially vertical to maximize scan pattern coverage and to minimize required item orientation.

The optical scanner also includes an optical transceiver for passing the laser beam and for collecting reflected light from the scanned article and a photodetector for generating signals representing the intensity of the light reflected from the article.

It is a feature of the present invention that the mirrored spinner and pattern mirrors combine to produce a plurality of scan lines which pass through the horizontal and vertical apertures. The scanner produces a scan pattern which more effectively covers multi-sided articles than single aperture scanners. The mirrored spinner includes three facets which are oriented at different angles with respect to a predetermined reference. The pattern mirrors are flat and include a first set of mirrors for reflecting the laser beam from the spinner and a second set of mirrors for reflecting the laser beam from the first set of mirrors to the article.

Preferably, the optical scanner produces twenty-four scan lines.

It is accordingly an object of the present invention to provide a dual aperture optical scanner.

It is another object of the present invention to provide a dual aperture optical scanner in which a first aperture is substantially vertical and a second aperture is substantially horizontal.

It is another object of the present invention to provide a dual aperture optical scanner which maximizes the illuminated surface area of an article to be scanned.

It is another object of the present invention to provide a dual aperture optical scanner which employs a single laser and motor.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
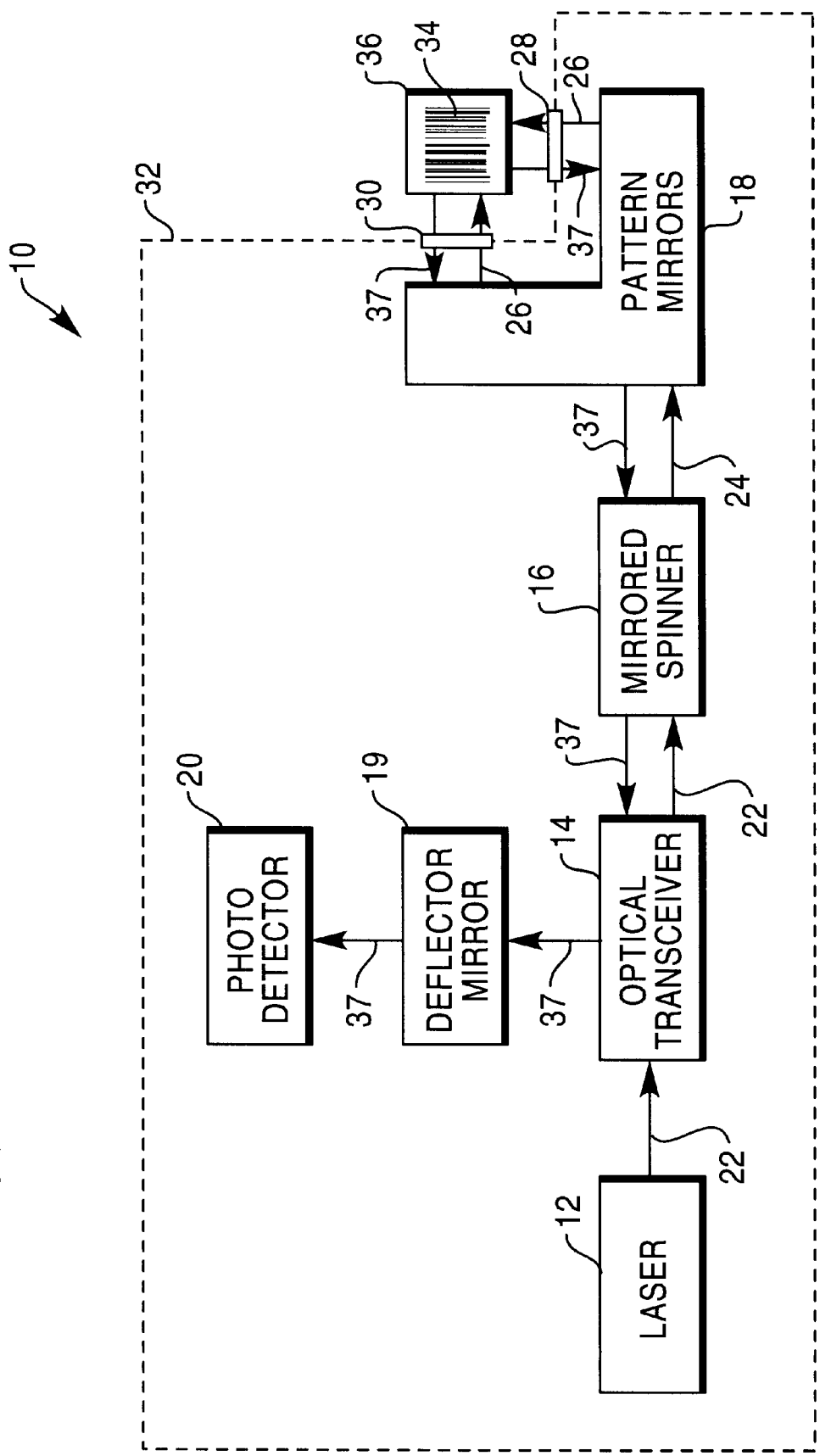
FIG. 1 is a block diagram of the dual aperture scanner of the present invention.

Referring now to FIG. 1, dual aperture optical scanner 10 of the present invention includes laser 12, optical transceiver 14, mirrored spinner 16, group 18 of pattern mirrors, deflector mirror 19, and photodetector 20. Laser 12 includes a laser diode, a focusing lens or lenses, and a collimating aperture. In the preferred embodiment, the laser diode emits visible light within a wavelength range of 670–690 nm and the collimating aperture and focusing lens produce a beam 22 having a beam waist of 220 microns in the center of the read zone.

Beam 22 passes through optical transceiver 14, which includes a mirrored collecting surface and an aperture for passing beam 22.

Beam 22 contacts mirrored spinner 16, which preferably has three planoreflective mirrored facets for producing scanning beams 24. Each facet has a slightly different elevation angle, which preferably differ by increments of about three degrees, resulting in three distinct scanning beam paths. The rotation of mirrored spinner 16 through an angle of about one-hundred-and-twenty degrees moves one facet completely through beam 22. Therefore, scanning beams 24 reflecting from mirrored spinner 16 cover an angle of about two-hundred-and-forty degrees and lie in a shallow cone.

Scanning beams 24 impact a group 18 pattern mirrors, which separate light from the facets of mirrored spinner 16 into a plurality of scan lines 26. In the preferred embodiment, group 18 of pattern mirrors split scanning beams 24 from each facet of mirrored spinner 16 into eight lines 26, resulting in twenty-four lines 26 for each complete revolution of mirrored spinner 16. Advantageously, all twenty-four lines 26 are produced by only one laser and motor.

It is a feature of scanner 10 of the present invention that some scan lines 26 pass through a substantially horizontal aperture 28 and some pass through a substantially vertical aperture 30 in scanner housing 32 on their way to bar code label 34 on article 36.

Reflected light 37 is redirected by group 18 of pattern mirrors towards spinner 16, which further directs it towards optical transceiver 14. Optical transceiver 14 directs and focuses reflected light 37 at deflector mirror 19, which further directs reflected light 37 towards photodetector 20. Photodetector 20 generates electrical signals representing the intensity of light 37.

Figure 2:
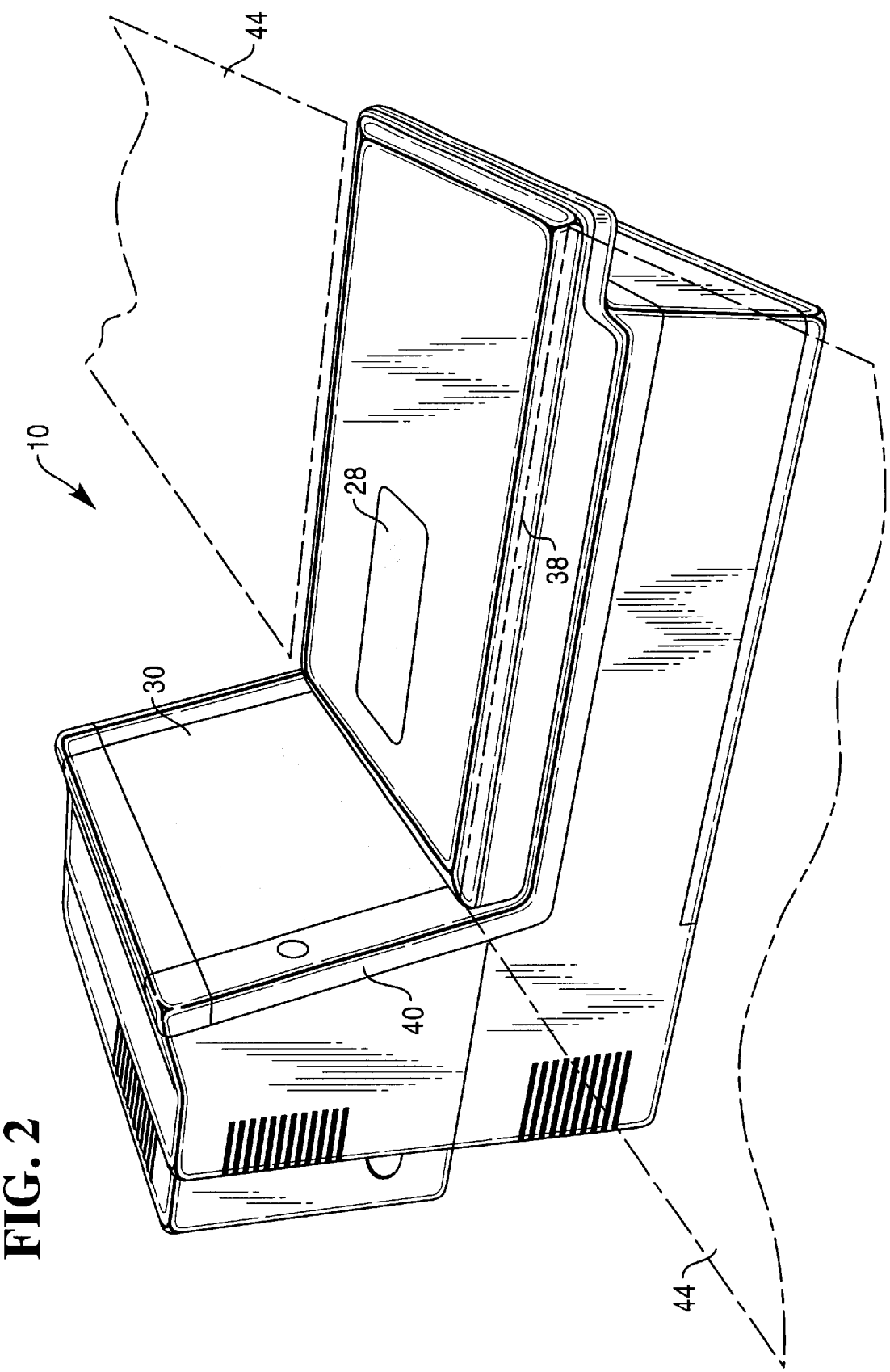
FIG. 2 is a exterior perspective view of the dual aperture scanner of the present invention.

Turning now to FIG. 2, apertures 28 and 30 are shown in more detail. Vertical aperture 30 is located within substantially vertical surface 40 and is large enough to illuminate a normal size item.

Horizontal aperture 28 is located within top surface 38 of housing 32 and is large enough to illuminate a normal size item. In this embodiment, vertical aperture 30 is larger than horizontal aperture 28.

Preferably, scanner 10 may be easily adapted to fit in a typical checkout counter 42. It is envisioned that top surface 38 be made substantially flush with the top surface 44 of counter 42.

Figure 3:
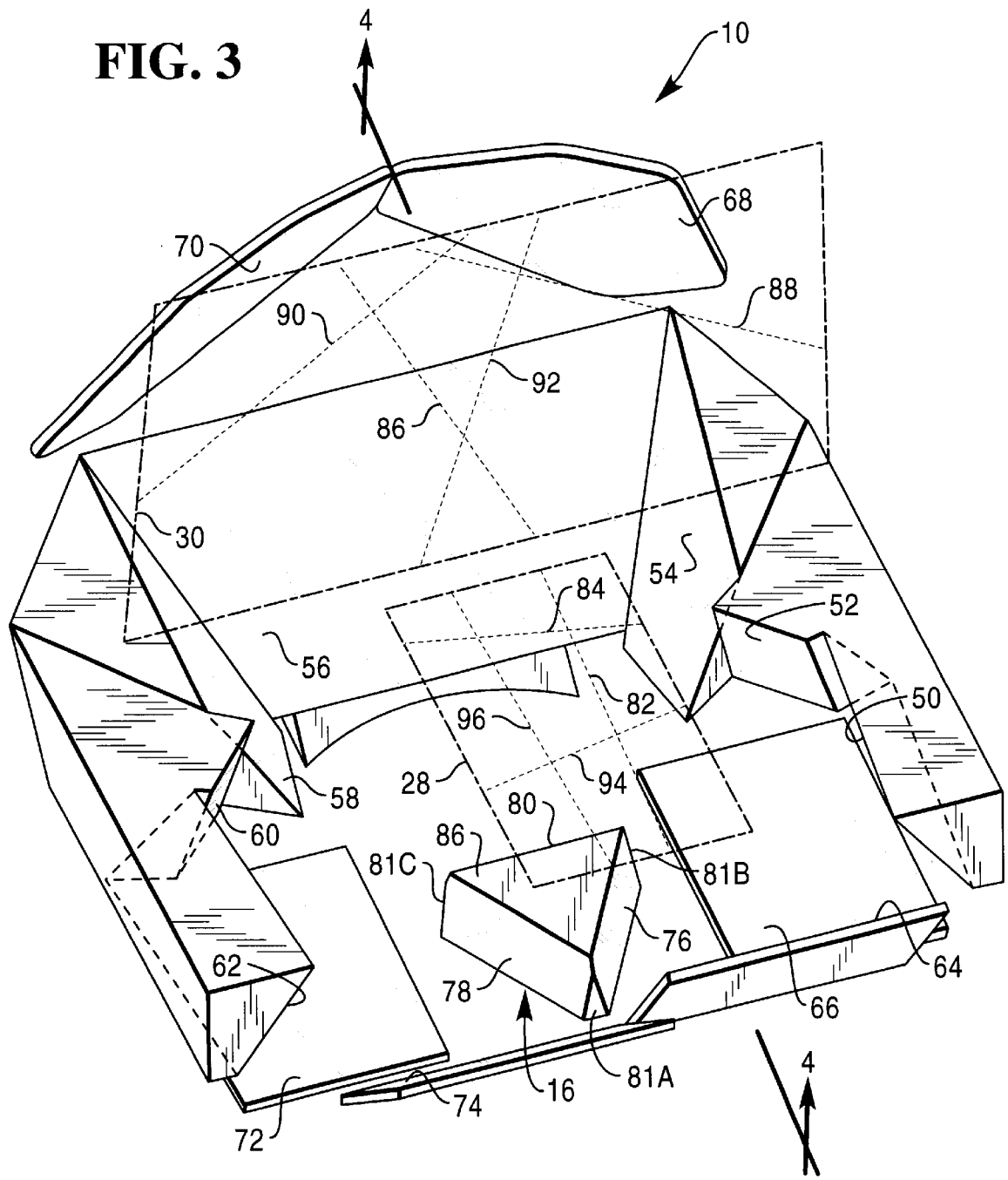
FIG. 3 is a interior perspective view of the dual aperture scanner of the present invention.
Figure 4:
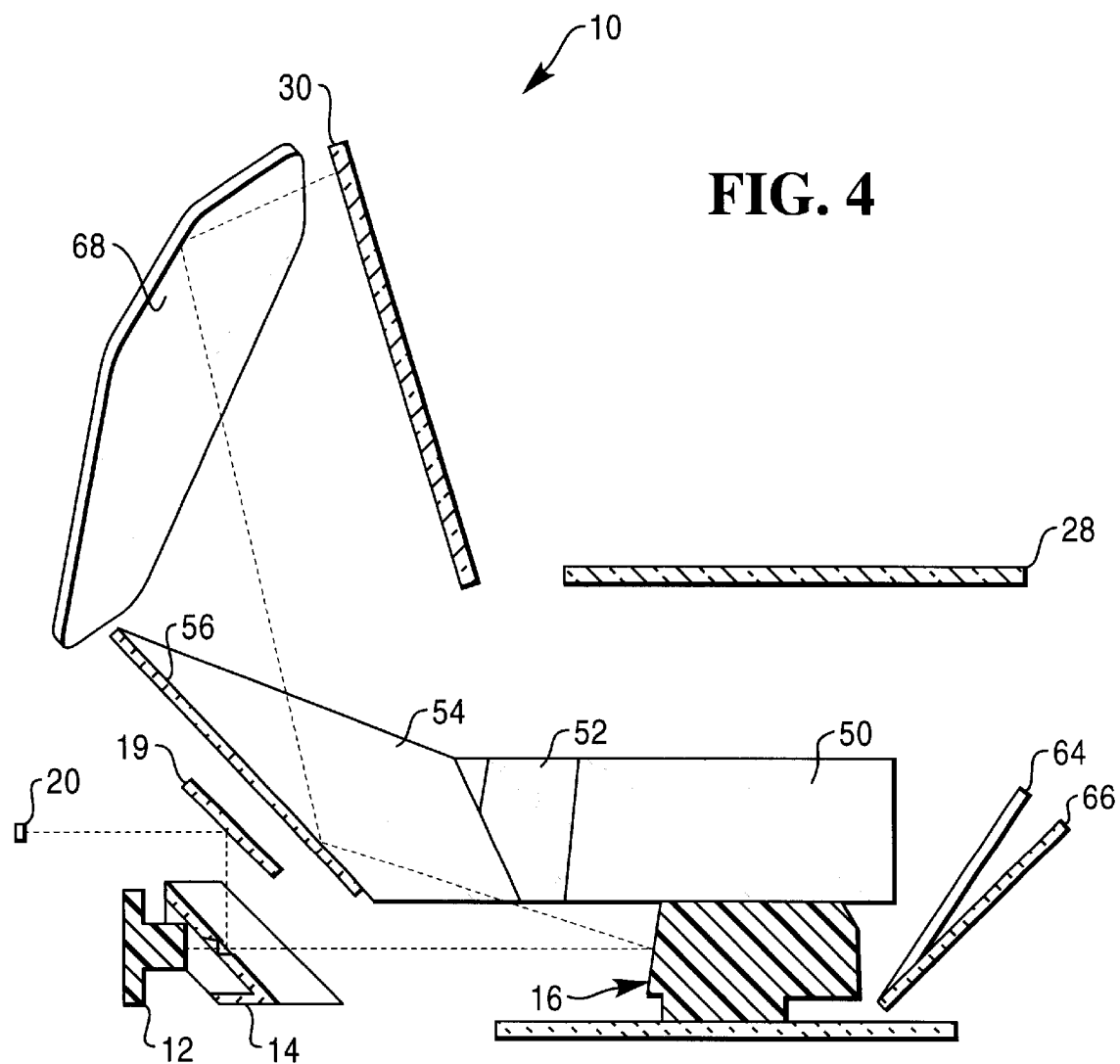
FIG. 4 is a sectional view of the dual aperture scanner of the present invention along lines 4—4 of FIG. 3.

Referring now to FIGS. 3 and 4, the arrangement of group 18 of pattern mirrors is shown in more detail. The pattern mirrors of group 18 are all flat mirrors. Scanning beams 24 from spinner 16 impact a first set of pattern mirrors 50–62 in group 18 in sequence and reflect therefrom to a second set of pattern mirrors 64–74 of group 18.

Figure 5A:
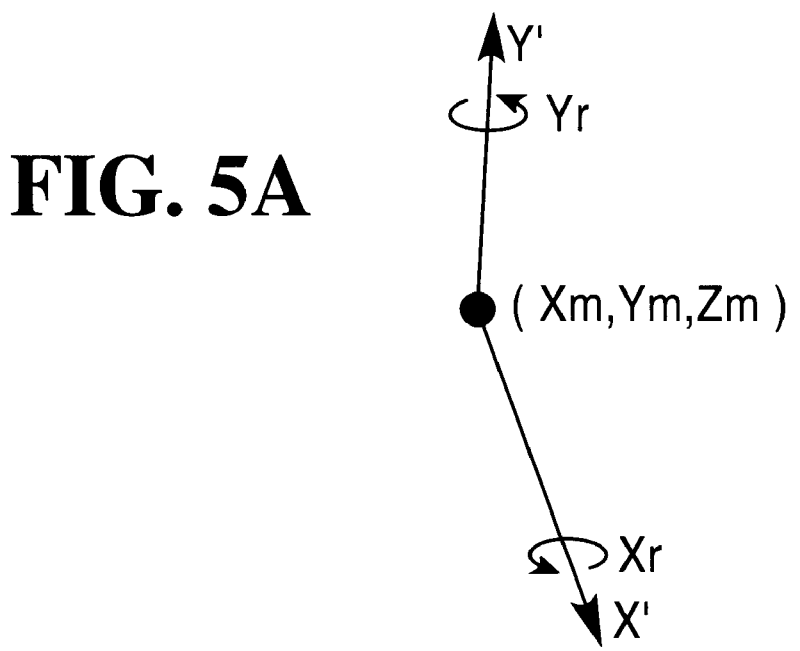
FIGS. 5A and 5B contain a view of a reference coordinate system for determining the location and orientation of a group of pattern mirrors within the dual aperture scanner of the present invention.
Figure 5B:
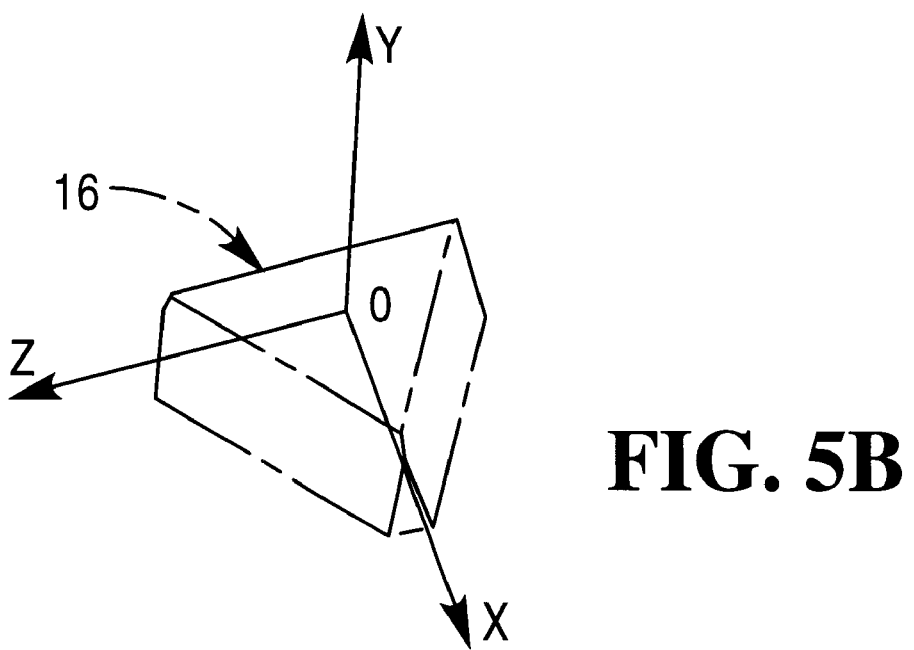

The reference coordinate system for pattern mirrors 50–74 is shown in FIGS. 5A and 5B and includes X, Y, and Z axes. Coordinates Xm, Ym, and Zm are measured in inches, and angles Xr and Yr, are measured in degrees, with positive angles being measured in a counter-clockwise direction. To get to its final orientation, each mirror is first oriented parallel to the X-Y plane through a point (Xm, Ym, Zm). Each mirror is then rotated through an angle Xr about a line X' parallel to the X axis and containing the point (Xm, Ym, Zm). Each mirror is then rotated through an angle Yr about a line Y' parallel to the Y axis and containing the point (Xm, Ym, Zm). Origin O is at the center of spinner 16. These five values uniquely define the planes for mirrors 50–74. Preferred values are shown for each mirror in the following table:

| Mirror | Xm | Ym | Zm | Xr | Yr |
|---|---|---|---|---|---|
| 50 | −1.200 | 0.500 | −5.302 | 33.0 | −5.0 |
| 52 | −1.353 | 0.500 | −4.774 | 15.0 | 41.0 |
| 54 | −3.575 | 0.650 | −2.393 | −35.0 | 10.0 |
| 56 | −3.575 | 0.650 | 0.000 | −42.5 | 90.0 |
| 58 | −3.575 | 0.650 | 2.393 | −35.0 | 170.0 |
| 60 | −1.353 | 0.500 | 4.774 | 15.0 | 139.0 |
| 62 | −1.200 | 0.500 | 5.302 | 33.0 | −175.0 |

-continued

| Mirror | Xm | Ym | Zm | Xr | Yr |
|---|---|---|---|---|---|
| 64 | 1.800 | −0.525 | −0.412 | −33.0 | −90.0 |
| 66 | 1.800 | −0.525 | −2.000 | −86.5 | 90.0 |
| 68 | −4.990 | 8.840 | 0.000 | 28.0 | 69.0 |
| 70 | −4.990 | 8.840 | 0.000 | 28.0 | 111.0 |
| 72 | 1.800 | −0.525 | 2.000 | −86.5 | 90.0 |
| 74 | 1.800 | −0.525 | −0.338 | −44.6 | −90.0 |

Beam 22 contacts planoreflective surfaces 76–80 of mirrored spinner 16. Each facet has a slightly different elevation angle, resulting in three distinct scanning beam paths. In the preferred embodiment, the elevation angles in degrees are 76.95, 79.00, and 81.05.

At the junction of the facets are interface surfaces 81A, B, and C, produced by rounding the edges between adjacent facets. In addition, the edges are cut back further at the bottom of spinner 16. Rounding serves to reduce the torque requirements for rotating spinner 16. At high motor operating speeds, wind resistance is a dominant component of motor torque. Thus, rounding serves to markedly reduce motor torque requirements, thereby facilitating the use of smaller and less expensive motors. Additionally, it reduces power consumption and heat dissipation.

In operation, laser beam 22 strikes each facet of mirrored spinner 16 in sequence. During the illumination of each facet, scanning beams 24 impact pattern mirrors 50–62 in sequence. First, light reflects from mirror 50 and then from mirror 66 to form scan line 82.

Second, light reflects from mirror 52 and then from mirror 64 as scan line 84.

Third, light reflects from mirror 54 and then from mirror 68 as scan line 86.

Fourth, light reflects from mirror 56 and then from mirror 68 as scan line 88.

Fifth, light reflects from mirror 56 and then from mirror 70 as scan line 90.

Sixth, light reflects from mirror 58 and then from mirror 70 as scan line 92.

Seventh, light reflects from mirror 60 and then from mirror 74 as scan line 94.

Eighth, light reflects from mirror 62 and then from mirror 72 as scan line 96.

The eight-step sequence above repeats itself for the two remaining spinner facets, yielding a total of twenty-four different scan lines 26.

Figure 7:
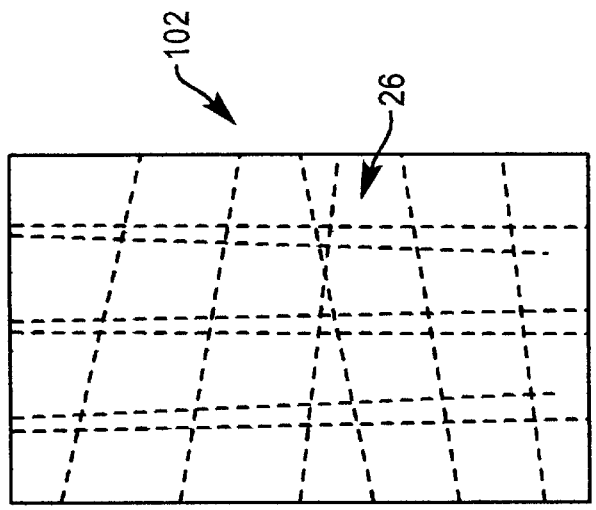
FIG. 7 is a plan view of the scan pattern emanating from a second aperture.
Figure 6:
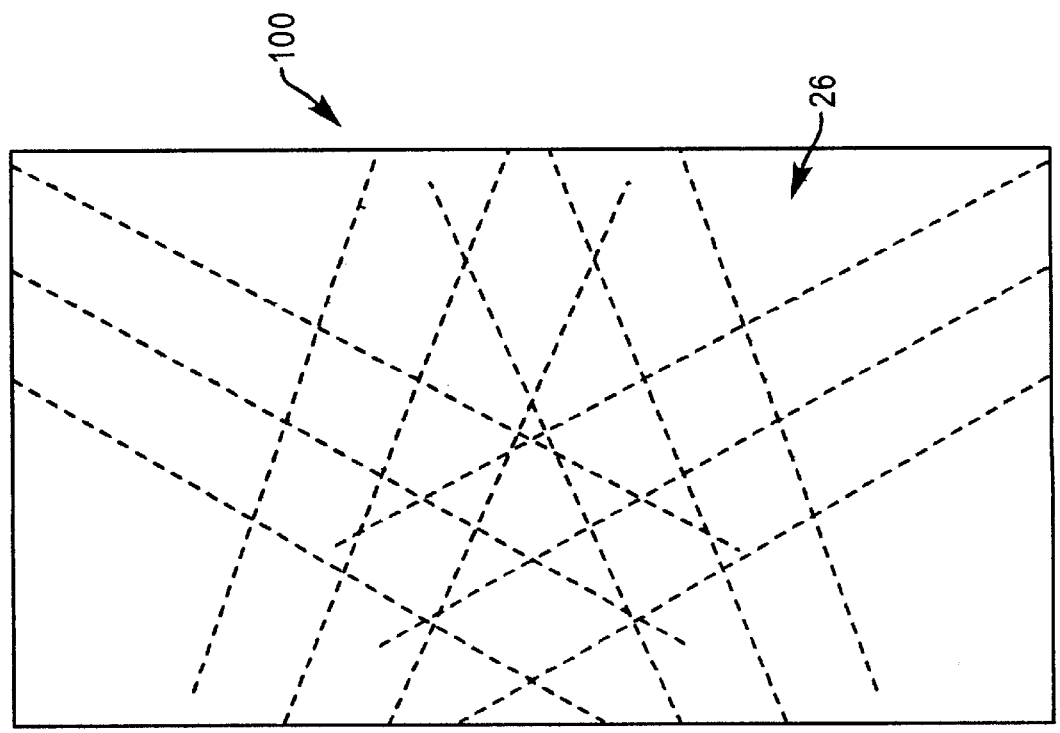
FIG. 6 is a plan view of the scan pattern emanating from a first aperture.

Referring now to FIGS. 6 and 7, vertical horizontal and scan patterns 100 and 102 are shown, including the eight scan lines of FIG. 3. Since each of the three facets of mirrored spinner 16 are inclined at different angles from one another, twenty-four different scan lines 26 are produced.

Although the invention has been described with particular reference to certain preferred embodiments thereof, variations and modifications of the present invention can be effected within the spirit and scope of the following claims.

We claim:

1. A method of scanning an item having a bar code from multiple directions, comprising the steps of
    generating laser light;
    providing a single multi-faceted mirror polygon in a path of said laser light;
    generating a first group of scanning beams and a second group of scanning beams by reflecting said laser light off said mirror polygon;

directing said first group of scanning beams through a first transparent member oriented in a first plane to scan a surface of the item from one orthogonal direction;

directing said second group of scanning beams through a second transparent member oriented in a second plane orthogonal to said first plane to scan the item from another orthogonal direction.

2. A method of scanning an item having a bar code from multiple directions, comprising the steps of arranging a housing with a first housing section having a first surface containing a first aperture and a second housing section having a second surface containing a second aperture wherein one of said first surface and said second surface is arranged substantially vertically and the other of said first surface and said second surface is arranged substantially horizontally;

generating laser light;

providing a single polygon mirror in a path of said laser light;

generating a first set of intersecting scan lines, a second set of intersecting scan lines, and a third set of intersecting scan lines by reflecting said laser light off said polygon mirror and across a plurality of pattern mirrors;

directing said first set of intersecting scan lines through the first aperture to scan the item from one orthogonal direction;

directing said second set of intersecting scan lines through the second aperture to scan the item from another orthogonal direction;

directing said third set of intersecting scan lines diagonally through the second aperture, to scan a side of the item opposite the first aperture from a diagonal direction.

3. A system for scanning an item from multiple directions, comprising:

a housing having a first surface containing a first aperture and a second surface containing a second aperture, wherein one of said first surface and said second surface is arranged substantially vertically and the other of said first surface and said second surface is arranged substantially horizontally;

a laser source which produces laser light within the housing;

a single polygon mirror for reflecting the laser light in a plurality of directions to produce a plurality of scanning beams including a first group of scanning beams, a second group of scanning beams, and a third group of scanning beams; and a plurality of pattern mirrors
for reflecting the first group of scanning beams through the first aperture to produce a first scan pattern of intersecting scan lines,
for reflecting the second group of scanning beams through the second aperture to produce a second scan pattern of intersecting scan lines, and
for reflecting the third group of scanning beams diagonally through the second aperture to produce a third scan pattern of intersecting scan lines for scanning a side of the item opposite the first aperture from a diagonal direction.

4. A method of scanning an item having a bar code from multiple directions, comprising the steps of providing a single multi-faceted mirror polygon in a scanner housing;

impinging laser light onto said mirror polygon;

rotating said mirror polygon;

generating a first group of scanning beams, a second group of scanning beams, and a third group of scanning beams by reflecting said laser light off said mirror polygon as it is being rotated;

directing said first group of scanning beams through a first transparent member oriented in a first plane to scan a surface of the item from a first orthogonal direction;

directing said second group of scanning beams through the first transparent member oriented in the first plane to scan the item from a diagonal direction; and directing said third group of scanning beams through a second transparent member oriented in a second plane at about ninety degrees to said first plane to scan the item from another orthogonal direction.

5. A bar code scanning system comprising:

a housing having a first window and a second window arranged generally orthogonally to one another;

a first set of pattern mirrors positioned adjacent the first window;

a second set of pattern mirrors positioned adjacent the second window;

a laser within the housing which produces a laser beam; and a polygon spinner having mirrored facets for reflecting the laser beam in a plurality of directions;

a motor for rotating the polygon spinner;

wherein said polygon spinner reflects a first group of scanning beams across the first set of pattern mirrors and out the first window and reflects a second group of scanning beams across the second set of pattern mirrors and out the second window.

6. An optical scanner comprising:

a housing having a first surface containing a first aperture and a second surface different from the first surface containing a second aperture;

a laser within the housing which produces a laser beam;

a polygon spinner having at least three mirrored facets for reflecting the laser beam in a plurality of directions to produce a plurality of scanning beams including a first group of scanning beams and a second group of scanning beams; and a plurality of pattern mirrors, including a plurality of pairs of pattern mirrors, for reflecting the first group of scanning beams through the first aperture to produce a first scan pattern including a plurality of intersecting scan lines, and for reflecting the second group of scanning beams through the second aperture to produce a second scan pattern including a plurality of intersecting scan lines;

wherein the laser beam contacts each pattern mirror as the spinner revolves.

7. A method of scanning an item having a bar code from multiple directions, comprising the steps of generating laser light;

providing a single multi-faceted mirrored polygon in a path of said laser light;

generating a first group of scanning beams, a second group of scanning beams, and a third group of scanning beams by reflecting said Laser light off said mirror polygon;

directing said first group of scanning beams through a first transparent member oriented in a first plane to scan a surface of the item from one orthogonal direction;

directing said second group of scanning beams through the first transparent member oriented in the first plane to scan the item from a diagonal direction; and directing said third group of scanning beams through a second transparent member oriented in a second plane orthogonal to said first plane to scan the item from an other orthogonal direction.

8. An optical scanner comprising:

a housing having a substantially vertical surface containing a first aperture and a substantially horizontal surface containing a second aperture;

a single laser which produces a laser beam within the housing;

a polygon spinner having mirrored facets for reflecting the laser beam in a plurality of directions to produce a plurality of scanning beams including a first group of scanning beams, a second group of scanning beams, and a third group of scanning beams; and a plurality of pattern mirrors, including a plurality of groups of pattern mirrors, for reflecting the first group of scanning beams through the first aperture to produce a first scan pattern consisting of a plurality of intersecting scan lines, for reflecting the second group of scanning beams through the first aperture to produce a second scan pattern consisting of a plurality of intersecting scan lines, and for reflecting the third group of scanning beams through the second aperture to produce a third scan pattern consisting of a plurality of intersecting scan lines.

9. The optical scanner as recited in claim 8, wherein the spinner has at least three planoreflective facets.

10. The optical scanner as recited in claim 9, wherein the facets are oriented at different angles with respect to a predetermined reference.

11. The optical scanner as recited in claim 8, further comprising:

an optical transceiver for passing the laser beam and for collecting reflected light from the scanned article; and a photodetector for generating signals representing the intensity of the light reflected from an article having a bar code label to be scanned.

12. The optical scanner as recited in claim 8, wherein the housing comprises:

a substantially horizontal surface containing the first aperture; and a substantially vertical surface containing the second aperture.

13. The optical scanner as recited in claim 8, wherein the laser comprises a laser diode.

14. The optical scanner as recited in claim 8, wherein the pattern mirrors comprise:

a first group of mirrors for reflecting the laser beam from the spinner;

a second group of mirrors for reflecting the laser beam from the first group of mirrors; and a third group of mirrors for reflecting the laser beam from some of the mirrors in the second group of mirrors.

15. A bar code scanning system comprising:

a housing having a first window and a second window arranged generally orthogonally to one another;

a first set of pattern mirrors positioned adjacent the first window;

a second set of pattern mirrors positioned adjacent the second window, including first, second, and third subsets of pattern mirrors;

a laser within the housing which produces a laser beam;

a single scanning means within the housing comprising a mirror polygon; and a motor for rotating the mirror polygon;

wherein said mirror polygon reflects a first group of scanning beams across the first set of pattern mirrors and out the first window, reflects a second group of scanning beams across the first and third subsets of pattern mirrors and out the second window, and reflects a third group of scanning beams across the second and third subsets of pattern mirrors and out the second window.

16. A method for scanning an article having a bar code label with minimal article orientation comprising the steps of:

(a) generating a single laser beam;

(b) providing a polygon spinner including a plurality of mirrored facets;

(c) reflecting the laser beam from the polygon spinner at a plurality of pattern mirrors within a scanner housing; and (d) reflecting a first group of scan lines from the pattern mirrors through a vertical aperture within the scanner housing to produce a first scan pattern consisting of a plurality of intersecting scan lines, reflecting a second group of scan lines from the pattern mirrors through a vertical aperture within the scanner housing to produce a second scan pattern consisting of a plurality of intersecting scan lines, and reflecting a third group of scan lines through a horizontal aperture within the scanner housing to produce a third scan pattern consisting of a plurality of intersecting scan lines.

17. The method as recited in claim 16, further comprising the step of:

(e) moving the article through the scan lines.

18. The method as recited in claim 16, wherein step (c) comprises the substep of:

(1) rotating a spinner having a plurality of mirrored facets in the path of the laser beam, each facet having a predetermined elevation angle; and (2) reflecting the laser beam from each of the facets in turn as the spinner rotates.

19. The method as recited in claim 18, wherein the spinner has at least three mirrored facets.

20. The method as recited in claim 18, wherein substep (c-1) comprises the substep of:

(A) energizing a motor coupled to the spinner.

* * * * *

UNITED STATES PATENT AND TRADEMARK OFFICE
CERTIFICATE OF CORRECTION

PATENT NO.     : 6,536,668 B1                                                Page 1 of 1
DATED          : March 25, 2003
INVENTOR(S)    : Detwiler, P. O. and Mergenthaler, B. M.

It is certified that error appears in the above-identified patent and that said Letters Patent is hereby corrected as shown below:

<u>Title page,</u>
Item [63], insert -- Related U.S. Application Data,
[63] Continuation of application No. 08/312,391, May 9, 2000, Pat. No. 6,059,189, which is a continuation of application No. 08/064,292, Jul. 15, 1993, abandoned, which is a continuation of application No. 07/767,746, Sep. 30, 1991, Pat. No. 5,229,588. --

Signed and Sealed this

Twenty-seventh Day of January, 2004

JON W. DUDAS
*Acting Director of the United States Patent and Trademark Office*